(12) United States Patent
Miyashita et al.

(10) Patent No.: US 10,069,365 B2
(45) Date of Patent: Sep. 4, 2018

(54) **THREE-PHASE ELECTROMAGNETIC MOTOR WITH 8*N PERMANENT MAGNET ROTOR AND 6*N MAGNETIC POLE STATOR WITH 3*N WINDINGS AROUND EVERY OTHER MAGNETIC POLE**

(71) Applicants: Toshihito Miyashita, Tokyo (JP); Manabu Horiuchi, Tokyo (JP)

(72) Inventors: Toshihito Miyashita, Tokyo (JP); Manabu Horiuchi, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 154 days.

(21) Appl. No.: 14/466,381

(22) Filed: Aug. 22, 2014

(65) Prior Publication Data

US 2015/0061449 A1    Mar. 5, 2015

(30) Foreign Application Priority Data

Sep. 4, 2013    (JP) .................................. 2013-183344

(51) Int. Cl.
*H02K 1/00*    (2006.01)
*H02K 3/28*    (2006.01)
(Continued)

(52) U.S. Cl.
CPC .............. *H02K 3/28* (2013.01); *H02K 1/146* (2013.01); *H02K 1/2753* (2013.01); *H02K 3/18* (2013.01);
(Continued)

(58) Field of Classification Search
CPC ...... H02K 1/165; H02K 1/146; H02K 1/2753; H02K 3/18; H02K 3/28; H02K 3/48;
(Continued)

(56) References Cited

U.S. PATENT DOCUMENTS 4,549,104 A    10/1985    Niimura et al.
4,672,253 A *   6/1987    Tajima .................. H02K 21/16
                                                    310/156.01
(Continued)

FOREIGN PATENT DOCUMENTS

CN    202918081 U    5/2013
DE    19905748 A1    8/1999
(Continued)

OTHER PUBLICATIONS

IEEE Article _Eastham 1995 IEEE A Brushless DC Disc Drive Spindle Motor.*
(Continued)

*Primary Examiner* — Bernard Rojas
*Assistant Examiner* — Maged Almawri
(74) *Attorney, Agent, or Firm* — Drinker Biddle & Reath LLP

(57) ABSTRACT

A three-phase electromagnetic motor includes: a stator that is formed by winding a winding around a magnetic pole formed between slots of a stator core; and a rotor that is disposed inside the stator and has a permanent magnet. The three-phase electromagnetic motor is formed of 8n poles and 6n slots (n is a natural number). 3n windings are wound around every other magnetic pole among a plurality of magnetic poles of the stator core.

3 Claims, 4 Drawing Sheets

(51) Int. Cl.
*H02K 3/48* (2006.01)
*H02K 21/16* (2006.01)
*H02K 29/03* (2006.01)
*H02K 1/27* (2006.01)
*H02K 3/18* (2006.01)
*H02K 1/16* (2006.01)
*H02K 1/14* (2006.01)
*H02K 1/08* (2006.01)

(52) U.S. Cl.
CPC ............. *H02K 3/48* (2013.01); *H02K 21/16* (2013.01); *H02K 29/03* (2013.01); *H02K 1/08* (2013.01); *H02K 1/14* (2013.01); *H02K 1/141* (2013.01); *H02K 1/165* (2013.01)

(58) Field of Classification Search
CPC .......... H02K 21/16; H02K 29/03; H02K 1/06; H02K 1/08; H02K 1/14; H02K 1/141; H02K 1/148; H02K 1/16
USPC ........... 310/216.073, 195, 216.001, 216.069, 310/216.071, 216.072, 216.074, 216.096, 310/216.097, 216.019, 216.059, 185
See application file for complete search history.

(56) References Cited

U.S. PATENT DOCUMENTS

| | | | | |
|---|---|---|---|---|
| 4,874,975 A | | 10/1989 | Hertrich | |
| 5,874,795 A | * | 2/1999 | Sakamoto | H02K 3/28 310/156.12 |
| 6,121,711 A | * | 9/2000 | Nakahara | H02K 1/14 242/432.3 |
| 8,089,192 B2 | * | 1/2012 | Li | H02K 1/148 310/179 |
| 8,508,095 B2 | * | 8/2013 | Husband | H02K 21/44 310/12.24 |
| 8,622,722 B2 | * | 1/2014 | Li | F02M 37/08 310/216.055 |
| 9,287,818 B2 | * | 3/2016 | Khanin | H02P 25/22 |
| 2001/0011854 A1 | * | 8/2001 | Heyden | H02K 3/522 310/254.1 |
| 2003/0033709 A1 | * | 2/2003 | Bradfield | H02K 15/0018 29/596 |
| 2003/0048017 A1 | * | 3/2003 | Nakano | H02K 21/12 310/152 |
| 2004/0007936 A1 | * | 1/2004 | Cros | H02K 1/146 310/257 |
| 2009/0102309 A1 | | 8/2009 | Kamibayashi et al. | |
| 2010/0054971 A1 | * | 3/2010 | Li | H02K 1/14 417/423.7 |
| 2013/0106254 A1 | * | 5/2013 | Qi | H02K 1/146 310/68 B |
| 2013/0134805 A1 | * | 5/2013 | Jung | H02K 21/44 310/46 |
| 2015/0197147 A1 | | 7/2015 | Koh et al. | |

FOREIGN PATENT DOCUMENTS

| | | |
|---|---|---|
| EP | 0182702 A1 | 5/1986 |
| JP | S5990279 U | 6/1984 |
| JP | H02104746 U | 8/1990 |
| JP | H0742209 B2 | 5/1995 |
| JP | 2004304928 A | 10/2004 |
| JP | 4363132 B2 | 11/2009 |
| JP | 201063354 A | 3/2010 |
| JP | 2013/009593 A | 1/2013 |
| KR | 20130141908 A | 12/2013 |
| WO | WO-2013/191330 A1 | 12/2013 |

OTHER PUBLICATIONS

EIC STIC 2800 Search Report No. 561918 dated Feb. 14, 2018.*
European Search Report for EP 14 18 2543, dated Mar. 18, 2016.
European Search Report for EP 14 18 2543, dated Mar. 29, 2016.
Office Action for corresponding application Japanese Office Action 2013-183344 dated Oct. 11, 2016.
Korean Office Action for Korean Patent Application No. 10-2014-0116198, dated Nov. 12, 2017.
Chinese Office Action for Chinese Patent Application No. 201410443400, dated Jan. 29, 2018.

* cited by examiner

THREE-PHASE ELECTROMAGNETIC MOTOR WITH 8*N PERMANENT MAGNET ROTOR AND 6*N MAGNETIC POLE STATOR WITH 3*N WINDINGS AROUND EVERY OTHER MAGNETIC POLE

BACKGROUND

1. Technical Field

The present invention relates to a three-phase electromagnetic motor in which a winding structure of magnetic poles formed between slots of a stator core is improved.

2. Description of Related Art

As an electromagnetic motor, a brushless motor or a Permanent Magnet Motor (PM type motor) is exemplified. When using a three-phase power supply in the electromagnetic motor, typically, windings of a u-phase, a v-phase, and a w-phase are disposed around magnetic poles of a stator core in this order so that the number of windings needs to be a multiple of three.

In order to minimize winding costs and connection costs in the three-phase electromagnetic motor, the minimum value of the number of windings is three. When winding in a concentrated manner with a number of windings of three is performed, two poles and three slots, and four poles and three slots are typical combinations of the number of poles and the number of slots. However, if the number of a permanent magnet poles is small, there is a problem that a cogging torque is increased.

In the related art, various techniques relating to a winding structure of an electromagnetic motor have been suggested. For example, a motor in which an auxiliary pole that is not subjected to winding is disposed between magnetic poles that are subjected to winding has been disclosed (see Japanese Unexamined Utility Model Registration Application Publication No. 59-90279). According to the technique of Japanese Unexamined Utility Model Registration Application Publication No. 59-90279, high efficiency of the motor is achieved by reducing manufacturing costs and increasing magnet utilization.

Furthermore, a motor is disclosed in which windings are disposed in every other magnetic pole and a width of a magnetic pole that is subjected to winding is greater than a width of a magnetic pole that is not subjected to winding (see Japanese Patent No. 4363132). According to Japanese Patent No. 4363132, it is possible to improve the performance of insulation between windings of different phases adjacent to each other and it is possible to reduce winding costs.

Furthermore, a motor is disclosed in which a winding is continuously disposed in two poles and a magnetic pole that is not subjected to winding is disposed in a third magnetic pole (see Japanese Unexamined Patent Application Publication No 2004-304928). According to Japanese Unexamined Patent Application Publication No 2004-304928, it is possible to reduce winding costs and to achieve high efficiency for the motor.

However, the motor disclosed in Japanese Unexamined Utility Model Registration Application Publication No. 59-90279 is not suitable for a three-phase power supply because it has six poles and eight slots. The motor disclosed in Japanese Patent No. 4363132 has ten poles and twelve slots and the motor disclosed in Japanese Unexamined Patent Application Publication No. 2004-304928 has eight poles and nine slots and thereby is suitable for the three-phase power supply.

As described above, in the three-phase electromagnetic motor, when employing a combination of a typical number of poles and number of slots such as two poles and three slots or four poles and three slots, there is a problem that cogging torque is increased.

Therefore, in order to prevent an increase in cogging torque, a combination of eight poles and six slots, eight poles and nine slots, ten poles and twelve slots, or the like is often selected. That is, there is a contradictory relationship between cost reduction by reducing the number of windings and a reduction of the cogging torque.

However, a combination is conceivable in which the number of poles is much greater than the number of slots. For example, a combination of eight poles and three slots, ten poles and three slots, or the like may be considered. However, in this case, the cogging torque is reduced, but a short circuit of a magnet flux of a permanent magnet between poles occurs and motor efficiency is significantly reduced depending on the decrease in torque and thereby this configuration would almost certainly not be adopted.

Thus, development of a technique that can reduce winding costs and connecting costs, and achieve high efficiency for the motor by minimizing the number of windings (three windings) is required.

SUMMARY

The present invention has been made in view of the above circumstances and an object of the invention is to provide a three-phase electromagnetic motor that is capable of reducing winding costs and connecting costs, and achieving high efficiency for the motor by minimizing the number of windings with respect to a three-phase power supply.

A three-phase electromagnetic motor of the invention, in order to achieve the object described above, includes a stator that is formed by winding a winding around a magnetic pole formed between slots of a stator core and a rotor that is disposed inside the stator and has a permanent magnet.

The three-phase electromagnetic motor includes 8n poles and 6n slots (n is a natural number). 3n windings are wound around every other magnetic pole among a plurality of magnetic poles of the stator core.

In the three-phase electromagnetic motor according to the invention, 8n poles and 6n slots (n is a natural number) are provided, and 3n windings are wound around every other magnetic pole among the plurality of magnetic poles of the stator core. Therefore, the number of windings with respect to the three-phase power supply is minimized.

Therefore, according to the three-phase electromagnetic motor of the invention, it is possible to reduce winding costs and connecting costs, and it is possible to achieve high efficiency for the motor by minimizing the number of windings with respect to the three-phase power supply.

DETAILED DESCRIPTION

Hereinafter, three-phase electromagnetic motors according to first to third embodiments will be described with reference to the drawings.

In three-phase electromagnetic motors according to the first to third embodiments, 8n poles and 6n slots (n is a natural number) are provided and 3n windings are wound around every other magnetic pole in a plurality of magnetic poles of a stator core. Therefore, according to the first to third embodiments, it is possible to reduce winding costs and connecting costs, and it is possible to realize a three-phase electromagnetic motor having high efficiency by minimizing the number of windings with respect to the three-phase power supply.

[First Embodiment]
[Configuration of Three-phase Electromagnetic Motor]

Figure 1:
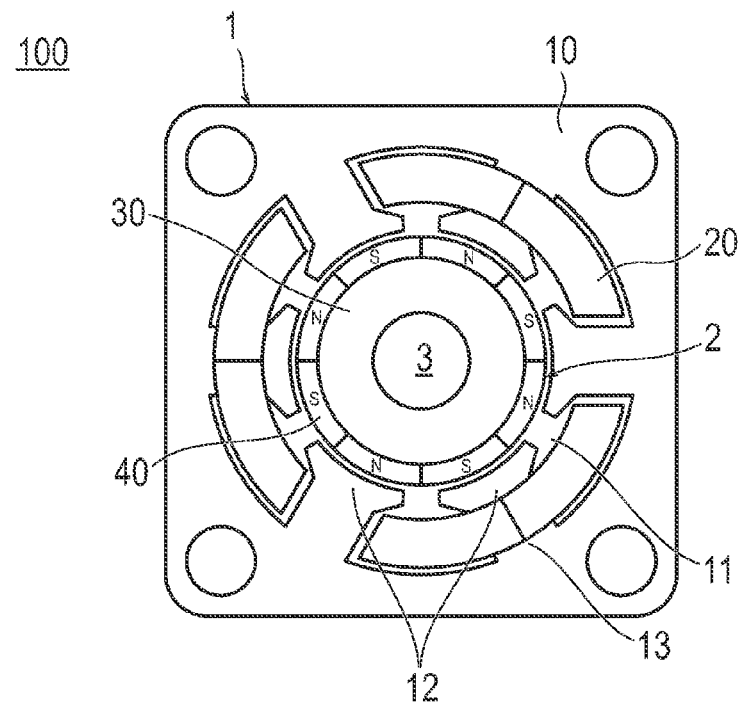
FIG. 1 is a schematic view of a three-phase electromagnetic motor according to a first embodiment.
Figure 2:
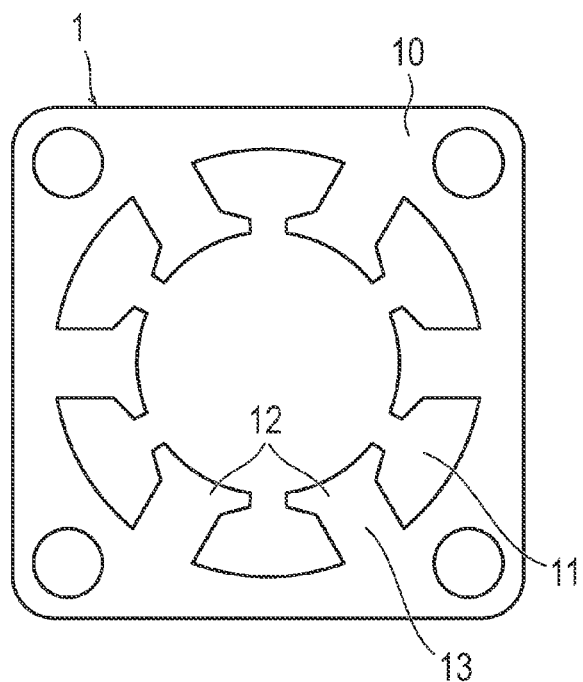
FIG. 2 is a schematic view of a stator core of the three-phase electromagnetic motor according to the first embodiment.

First, a configuration of the three-phase electromagnetic motor according to the first embodiment will be described with reference to FIGS. 1 and 2. FIG. 1 is a schematic view of the three-phase electromagnetic motor according to the first embodiment. FIG. 2 is a schematic view of the stator core of the three-phase electromagnetic motor according to the first embodiment.

The three-phase electromagnetic motor according to the embodiment includes 8n poles and 6n slots (n is a natural number). A three-phase electromagnetic motor 100 in FIG. 1 is a Surface Permanent Magnet Motor (SPM) type three-phase AC servo motor and includes eight poles and six slots where n=1.

As illustrated in FIGS. 1 and 2, the three-phase electromagnetic motor 100 according to the embodiment includes a stator 1 and a rotor 2 that is disposed inside the stator 1.

The stator 1 has a stator core 10 and windings 20.

The stator core 10 is a thick cylindrical metal member. An inner peripheral surface of the stator core 10 has a circular shape and an outer peripheral surface has a rectangular shape. The stator core 10 of the embodiment has a stack structure formed by stacking thin plates on top of one another, but may be a unitary structure or a dust iron core.

A plurality of slots 11 as spaces for accommodating the windings 20 are radially defined on the inner peripheral side of the stator core 10 so as to face the rotor 2.

Each of the slots 11 is defined between teeth 12 and 12. A base end portion of each of the teeth 12 is a magnetic pole 13 around which the winding 20 is wound.

As a constituent material of the stator core 10, for example, a silicon steel plate is used, but the material is not limited to this example.

As illustrated in FIGS. 1 and 2, the windings 20 are disposed inside the slots 11 with electrical insulation members (not illustrated) disposed therebetween. The windings 20 are evenly disposed in a circumferential direction and are wound around every other magnetic pole 13 in a plurality of magnetic poles 13 that are radially arranged. That is, in a case of six slots, the number of the magnetic pole 13 is six magnetic poles, but since the windings 20 are wound around every other magnetic pole 13, the number of windings is three. Therefore, the number of slots 11 does not correspond to the number of windings 20.

In a case of the three-phase power supply, the windings 20 of a u-phase, a v-phase, and a w-phase are disposed in this order. Since the number of windings of the embodiment is three, the number of windings is minimized with respect to the three-phase power supply.

With reference to FIG. 1, the rotor 2 is provided around a shaft 3 and includes a rotor core 30 and permanent magnets 40. The shaft 3 is the center of rotation of the rotor 2.

The rotor core 30 is a substantially thick cylindrical metal member provided around the shaft 3. The rotor core 30 of the embodiment has a stack structure formed by stacking thin plates on top of one another, but may be a unitary structure or a dust iron core.

As a constituent material of the rotor core 30, for example, a silicon steel plate is used, but the material is not limited to this example.

Plurality of permanent magnets 40 of the embodiment are disposed on an outer peripheral surface of the rotor core 30. Therefore, a cross section shape of the permanent magnet 40 is an arc shape. Since the three-phase electromagnetic motor 100 of the embodiment has an SPM type eight-pole configuration, eight permanent magnets 40 are evenly disposed on the outer peripheral surface of the rotor core 30 in the circumferential direction.

As the permanent magnets, rare earth magnets such as neodymium magnets are exemplified, but the permanent magnets are not limited to this example.

[Operation of Three-phase Electromagnetic Motor]

Next, an operation of the three-phase electromagnetic motor according to the first embodiment will be described with reference to FIGS. 1 to 3.

In the three-phase electromagnetic motor according to the first embodiment, the stator 1 is provided so as to surround the rotor 2. The stator core 10 has a plurality of windings 20 that are radially arranged so as to face the rotor 2.

The windings 20 of the embodiment are evenly disposed in the circumferential direction of the stator core 10 and are wound around every other magnetic pole 13 among the plurality of magnetic poles 13 that are radially arranged. Specifically, since the number of slots of the embodiment is six, the number of magnetic poles 13 is six. Since the windings 20 are wound around every other magnetic pole 13 among six magnetic poles 13, the number of windings is three.

In a case of the three-phase power supply, typically, the windings 20 of the u-phase, the v-phase, and the w-phase are disposed in this order. Since the number of windings of the embodiment is three, it is possible to minimize the number of windings with respect to the three-phase power supply.

Figure 3:
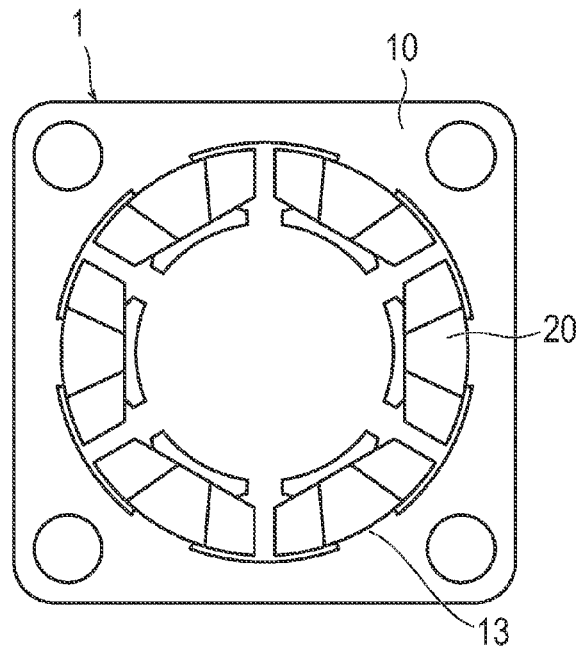
FIG. 3 is a schematic view of a winding structure of a three-phase electromagnetic motor of the related art.

Here, comparison is made to the winding structure of the three-phase electromagnetic motor of the related art with reference to FIG. 3. FIG. 3 is a schematic view of the winding structure of the three-phase electromagnetic motor of the related art.

As illustrated in FIG. 3, in the three-phase electromagnetic motor of the related art, the winding 20 is wound around each magnetic pole 13 of the stator core 10 in the six-slot stator 1. Therefore, the number of windings is six with respect to six magnetic poles 13. In the winding structure of the three-phase electromagnetic motor of the related art, since the number of windings is six, both winding costs and connecting costs are increased.

That is, according to the three-phase electromagnetic motor 100 of the first embodiment, it is possible to reduce the winding costs and the connecting costs by minimizing the number of windings with respect to the three-phase power supply.

Furthermore, since, in the three-phase electromagnetic motor 100 according to the first embodiment, the rotor 2 has the permanent magnets 40 in an eight-pole configuration, it is possible to prevent an increase in the cogging torque and to achieve high efficiency for the motor.

[Second Embodiment]

Figure 4:
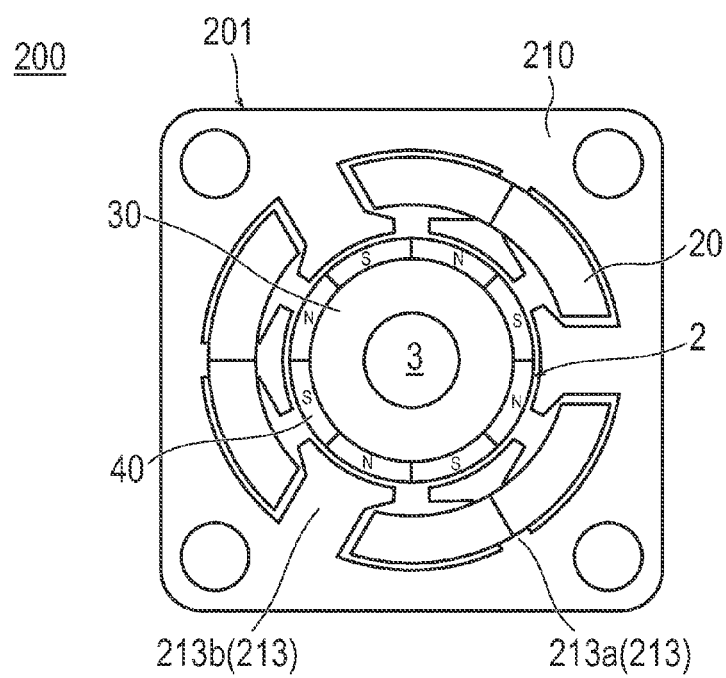
FIG. 4 is a schematic view of a three-phase electromagnetic motor according to a second embodiment.
Figure 5:
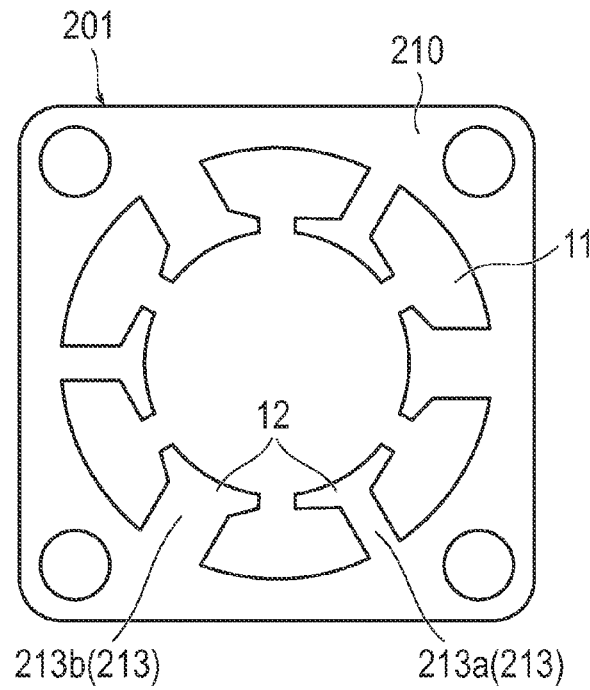
FIG. 5 is a schematic view of a stator core of the three-phase electromagnetic motor according to the second embodiment.

Next, a three-phase electromagnetic motor according to a second embodiment will be described with reference to FIGS. 4 and 5. FIG. 4 is a schematic view of the three-phase electromagnetic motor according to the second embodiment. FIG. 5 is a schematic view of a stator core of the three-phase electromagnetic motor according to the second embodiment. Moreover, the same reference numerals are given to the same constituent members as the first embodiment and the description thereof will be omitted.

Similar to the first embodiment, a three-phase electromagnetic motor 200 illustrated in FIG. 4 is an eight-pole six-slot three-phase AC servo motor, and includes a stator 201 and a rotor 2.

As illustrated in FIGS. 4 and 5, in the three-phase electromagnetic motor according to the second embodiment, the configuration of magnetic poles of a stator core 210 is different from that of the first embodiment.

That is, in the three-phase electromagnetic motor 200 according to the second embodiment, for six magnetic poles 213 that are evenly disposed in a circumferential direction of the stator core 210 and are radially arranged, widths of the magnetic poles are different from each other.

In the stator core 210 of the second embodiment, magnetic poles 213a having a small width and magnetic poles 213b having a large width are alternately arranged in the circumferential direction of the stator core 210. The windings 20 are wound around the magnetic poles 213a having a small width. Therefore, the number of windings is three and the number of windings with respect to the three-phase power supply is minimized. It is possible to reduce the winding costs and the connecting costs by minimizing the number of windings with respect to the three-phase power supply.

Furthermore, similar to the first embodiment, since in the three-phase electromagnetic motor 200 according to the second embodiment, the rotor 2 has the permanent magnets 40 of an eight-pole configuration, an increase in the cogging torque is prevented and it is possible to suppress a decrease in the torque.

Furthermore, since the windings 20 are wound around the magnetic poles 213a having a small width, it is possible to improve motor efficiency by enlarging the winding space.

The three-phase electromagnetic motor according to the second embodiment basically achieves operational effects similar to those of the first embodiment. Specifically, in the three-phase electromagnetic motor according to the second embodiment, the magnetic poles 213a having a small width and the magnetic poles 213b having a large width are alternately arranged in the circumferential direction of the stator core 210, and the windings 20 are wound around the magnetic poles 213a having the small width.

Therefore, the three-phase electromagnetic motor of the second embodiment has an advantageous effect in that the winding costs and the connecting costs are reduced and it is possible to improve motor efficiency by enlarging the winding space while suppressing a decrease in torque.

[Third Embodiment]

Figure 6:
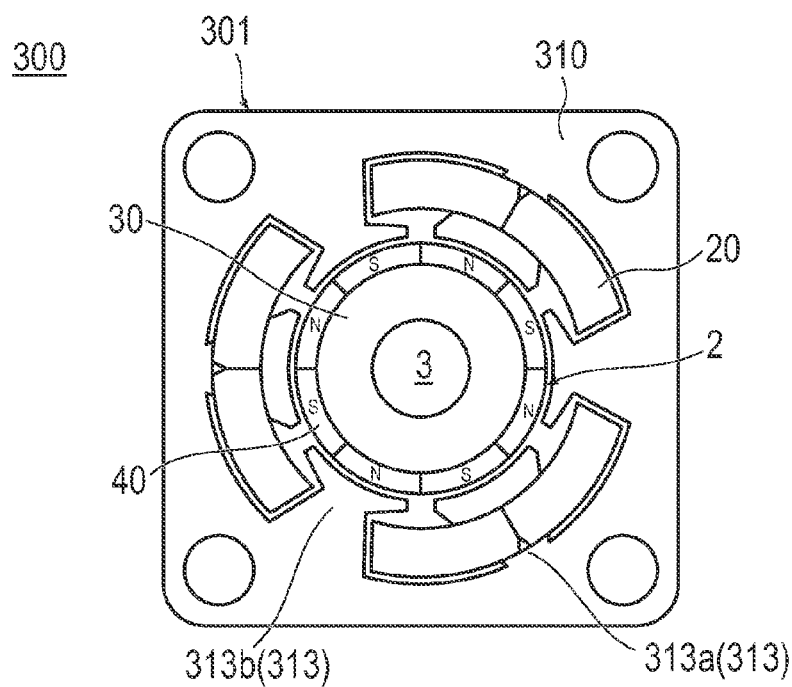
FIG. 6 is a schematic view of a three-phase electromagnetic motor according to a third embodiment.
Figure 7:
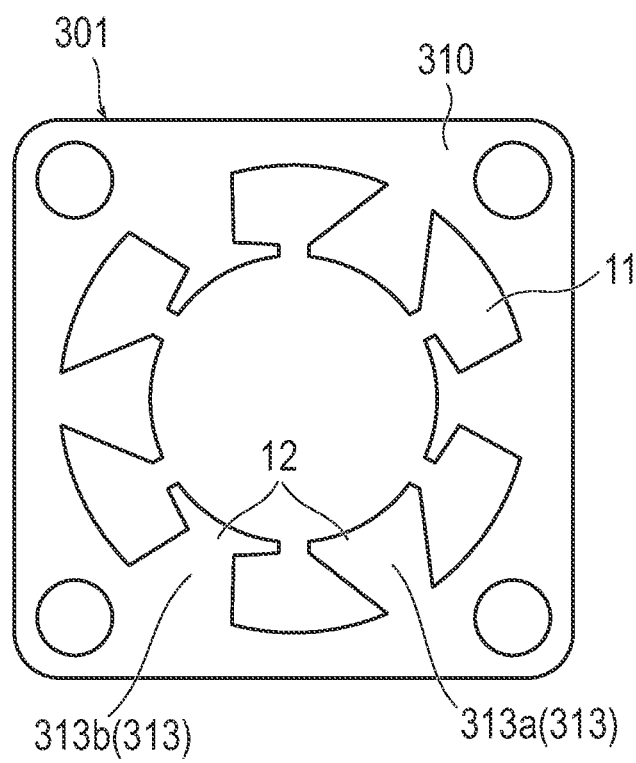
FIG. 7 is a schematic view of a stator core of the three-phase electromagnetic motor according to the third embodiment.

Next, a three-phase electromagnetic motor according to a third embodiment will be described with reference to FIGS. 6 and 7. FIG. 6 is a schematic view of the three-phase electromagnetic motor according to the third embodiment. FIG. 7 is a schematic view of a stator core of the three-phase electromagnetic motor according to the third embodiment. Moreover, the same reference numerals are given to the same constituent members of the first embodiment and the description thereof will be omitted.

Similar to the first and second embodiments, a three-phase electromagnetic motor 300 illustrated in FIG. 6 is an eight-pole six-slot three-phase AC servo motor, and includes a stator 301 and a rotor 2.

As illustrated in FIGS. 6 and 7, in the three-phase electromagnetic motor according to the third embodiment, a configuration of magnetic poles of a stator core 310 is different from those of the first and second embodiments.

That is, in the three-phase electromagnetic motor 300 according to the third embodiment, for six magnetic poles 313 that are evenly disposed in a circumferential direction of the stator core 310 and are radially arranged, the shapes of the magnetic poles are different from each other.

In the stator core 310 of the third embodiment, magnetic poles 313a whose width is larger on the inner diameter side and magnetic poles 313b whose width is smaller on the inner diameter side are alternately arranged in the circumferential direction of the stator core 310. The width of the magnetic poles 313a has been sequentially made larger toward the inner diameter side so that the magnetic poles 313a have a substantially trapezoidal shape. The width of the magnetic poles 313b has been sequentially made smaller toward the inner diameter side so that the magnetic poles 313b have a substantially reverse trapezoidal shape.

The windings 20 are wound around the magnetic poles 313a that are sequentially enlarged on the inner diameter side. Therefore, the number of windings is three and the number of windings with respect to the three-phase power supply is minimized. It is possible to reduce the winding costs and the connecting costs by minimizing the number of windings with respect to the three-phase power supply.

Furthermore, similar to the first and second embodiments, since in the three-phase electromagnetic motor 300 according to the third embodiment, the rotor 2 has the eight-pole permanent magnet 40, an increase in the cogging torque is prevented and it is possible to suppress a decrease in torque.

Furthermore, since the windings 20 are wound around the magnetic poles 313a that are sequentially enlarged on the inner diameter side, it is possible to effectively utilize the magnet flux of the permanent magnet 40 and it is possible to further achieve high efficiency for the motor.

The three-phase electromagnetic motor according to the third embodiment basically achieves operational effects similar to those of the first embodiment. Specifically, in the three-phase electromagnetic motor according to the third embodiment, the magnetic poles 313a whose width has been sequentially enlarged on the inner diameter side and the magnetic poles 313b whose width has been sequentially made smaller on the inner diameter side are alternately arranged in the circumferential direction of the stator core 310, and the windings 20 are wound around the magnetic poles 313a whose width has been sequentially enlarged on the inner diameter side.

Therefore, the three-phase electromagnetic motor of the third embodiment has an advantageous effect in that the winding costs and the connecting costs are reduced and it is possible to effectively utilize the magnet flux of the permanent magnet 40 and it is possible to further achieve high efficiency for the motor while suppressing a decrease in torque.

Preferred embodiments of the invention are described above, but the embodiments are examples for describing the invention and they are not intended to limit the range of the invention. It is possible to realize the invention in various aspects different from the embodiments described above without departing from the spirit thereof.

For example, in the embodiments, the SPM type three-phase electromagnetic motor is described as an example, but the invention can also be applied to an Internal Permanent Magnet (IPM) type three-phase electromagnetic motor.

Furthermore, in the above embodiments, a servo motor is described, but the invention can also be applied to a stepping motor.

Furthermore, in an 8n-pole 6n-slot configuration (n is a natural number), in case of n=2 or more, in order to minimize the number of windings and the number of connections, it is preferable that the windings 20 of each of the u-phase group, the v-phase group, and the w-phase group be continuously wound through a crossover wire. In a case of n=2 or more, the number of windings is 3n, but it is possible to minimize the number of windings to three by continuously winding the windings 20 of each of the u-phase group, the v-phase group, and the w-phase group through a crossover wire.

The entire disclosure of Japanese Patent Application No. 2013-183344 filed on Sep. 4, 2013 including specification, claims, drawings and summary are incorporated herein by reference in its entirety.

What is claimed is:

1. A three-phase electromagnetic motor comprising:
a stator that is formed by winding a winding around a magnetic pole formed between slots of a stator core; and
a rotor that is disposed inside the stator and has permanent magnet poles,
wherein 3*n windings are configured using 8*n permanent magnet poles and 6*n slots (n is a nonzero_natural number), and wound around every other magnetic pole among a plurality of magnetic poles of the stator core;
wherein the electromagnetic motor comprise more permanent magnet poles than slots; and
wherein the electromagnetic motor has a ratio of permanent magnet poles to slots of 8:6;
wherein each of the plurality of magnetic poles has a magnetic pole main part protruding from the stator core and a magnetic pole front end part whose width is made larger in a circumferential direction which is formed at a front end of the magnetic pole main part;
wherein the plurality of magnetic poles comprises a first magnetic pole in which a width of the magnetic pole main part is continuously made larger from a base of the magnetic pole main part to the magnetic pole front end part such that the first magnetic pole has a substantially trapezoidal shape; and a second magnetic pole in which a width of the magnetic pole main part is continuously made smaller from a base of the magnetic pole main part to the magnetic pole front end part such that the second magnetic pole has a substantially reverse trapezoidal shape; and
wherein the first magnetic pole and the second magnetic pole are alternately disposed, and the winding is wound around the magnetic pole main part of the first magnetic pole.

2. The three-phase electromagnetic motor according to claim 1,
wherein three windings are wound around every other magnetic pole of the stator core in the motor including the eight permanent magnet poles and six slots (n=1).

3. The three-phase electromagnetic motor according to claim 1, wherein, in case of n=2 or more, the windings of each of u-phase group, v-phase group and w-phase group are continuously wound through a crossover wire.

* * * * *